United States Patent [19]

Browne et al.

[11] Patent Number: 5,152,329
[45] Date of Patent: Oct. 6, 1992

[54] SURFACE LEVELLING DEVICE AND METHOD

[76] Inventors: Milton P. Browne, 10 Glyn Court, Cheltenham, Victoria 3192; Paul G. Dunne, 7 Conifer Street, Hampton, Victoria 3188; Massimo Gonella, 19 Valley Road, Research, Victoria 3095, all of Australia

[21] Appl. No.: 551,145
[22] Filed: Jul. 11, 1990
[51] Int. Cl.⁵ .............. B27C 1/00; B27B 1/00; E02F 3/76
[52] U.S. Cl. .............. 144/356; 144/114 R; 144/117 C; 144/373; 172/4.5; 356/5
[58] Field of Search .............. 172/4.5; 404/84; 299/1, 299/37; 144/114 R, 117 C, 356, 357, 373; 356/5, 141, 152

[56] References Cited

U.S. PATENT DOCUMENTS

| | | | |
|---|---|---|---|
| 2,342,267 | 2/1944 | Goff | 144/117 C |
| 3,604,512 | 9/1971 | Carter | 404/84 |
| 3,664,393 | 5/1972 | McLeod et al. | 144/117 C |
| 3,813,171 | 5/1974 | Teach et al. | 172/4.5 |
| 3,953,145 | 4/1976 | Teach | 172/4.5 |
| 4,162,708 | 7/1979 | Johnson | 172/4.5 |
| 4,221,505 | 9/1980 | Taylor-Smith | 172/4.5 |
| 4,273,196 | 6/1981 | Etsusaki et al. | 172/4.5 |
| 4,299,290 | 11/1981 | Nunes, Jr. | 172/4.5 |
| 4,895,440 | 1/1990 | Cain et al. | 172/4.5 |
| 4,978,246 | 12/1990 | Quenzi et al. | 404/84 |

Primary Examiner—W. Donald Bray
Attorney, Agent, or Firm—Sprung Horn Kramer & Woods

[57] ABSTRACT

A surface levelling device for levelling surfaces such as a wooden floor, the device including a rotatable cutting head (130) which is mounted in a movable framework (4) by means of independently controlled screw devices (84, 86). The screw devices are controlled by control circuits (130, 132) which are responsive to a sweeping laser beam (222) which rotates in a reference plane. The control circuits maintain the cutting head (130) parallel to the reference plane and at a predetermined distance therefrom regardless of movements of the framework (4) over the floor.

16 Claims, 13 Drawing Sheets

SURFACE LEVELLING DEVICE AND METHOD

This invention relates to a surface levelling device and method.

More particularly, the invention relates to a levelling device for levelling a surface such as a floor which can be made of timber or concrete. One area of application of interest is in the levelling of timber floors which have sagged or have been damaged or worn as a result of use over long periods of time. Another application would be the levelling of concrete surfaces such as floors, walls or ceilings which have been imperfectly levelled when cast or have been damaged or subjected to uneven wear.

According to the present invention there is provided a surface levelling device comprising a framework which is movable over a surface to be levelled, a surface cutting head, mounting means for mounting the cutting head in the framework such that the orientation of the cutting head relative to the framework can be adjusted, control means for controlling the cutting head relative to the framework, the control means including at least one sensor which is responsive to positional information transmitted to it by a transmitter located at a predetermined location relative to the surface to be levelled.

Preferably, the positional information is transmitted by way of a laser beam. Preferably further, the laser beam is arranged to sweep over the surface to be levelled at a predetermined height above a median plane of the surface to be levelled.

The invention also provides a method of levelling a surface comprising the steps of ascertaining a median plane of the surface to be levelled, sweeping a laser beam in a reference plane which is parallel to the median plane and spaced therefrom by a predetermined distance, moving cutting apparatus across said surface, detecting the laser beam as the cutting device moves across the surface and altering the position of a cutting head in the cutting device so that the cutting head maintains a predetermined relationship to the reference plane independently of movement of the cutting device.

The invention will now be further described with reference to the accompanying drawings, in which.

Figure 1:
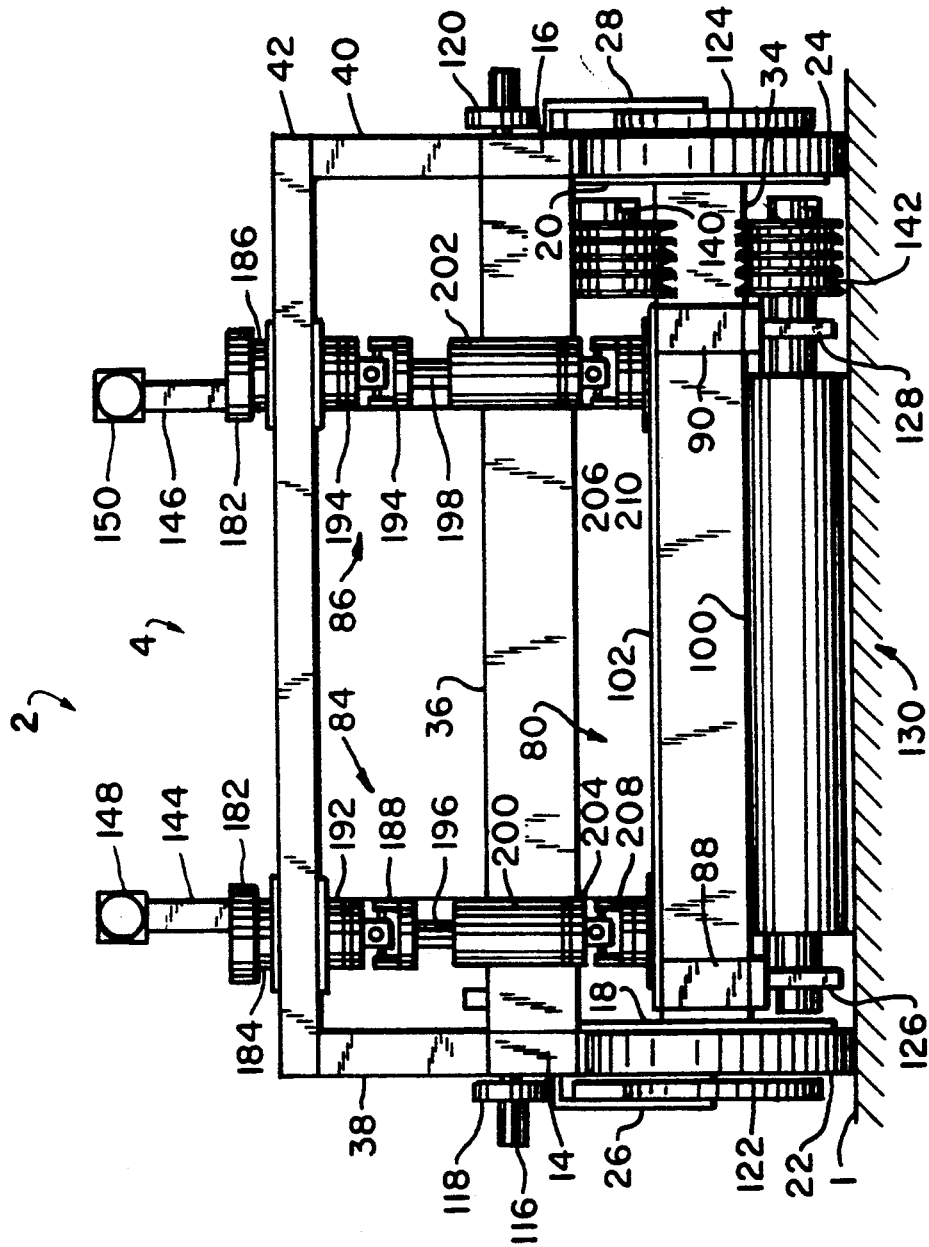
FIG. 1 is a schematic rear view of a levelling device of the invention.

The levelling device 2 of the invention, as shown in the drawings, comprises a framework 4 having front side arms 6 and 8, diagonal side arms 10 and 12 and rear side arms 14 and 16. Connected to the inside of side arms 10 and 14 is a rear axle plate 18. Similarly a rear axle plate 20 is connected to the inside of side arms 12 and 16. Stub axles (not shown) extend from the rear axle plates through wheels 22 and 24 to vertical fork legs 26 and 28, which are supported by the sidearms 14 and 16 and horizontal fork legs 30 and 32, which are supported by sidearms 6 and 8. The framework includes a front crossmember 34 connected to the front of side arms 6 and 8 and a centre crossmember 36 connected to the side arms 14 and 16. The framework also includes posts 38 and 40, the lower ends of which are connected to the side arms 14 and 16 and the upper ends of which are connected to a rear crossmember 42.

Figure 4:
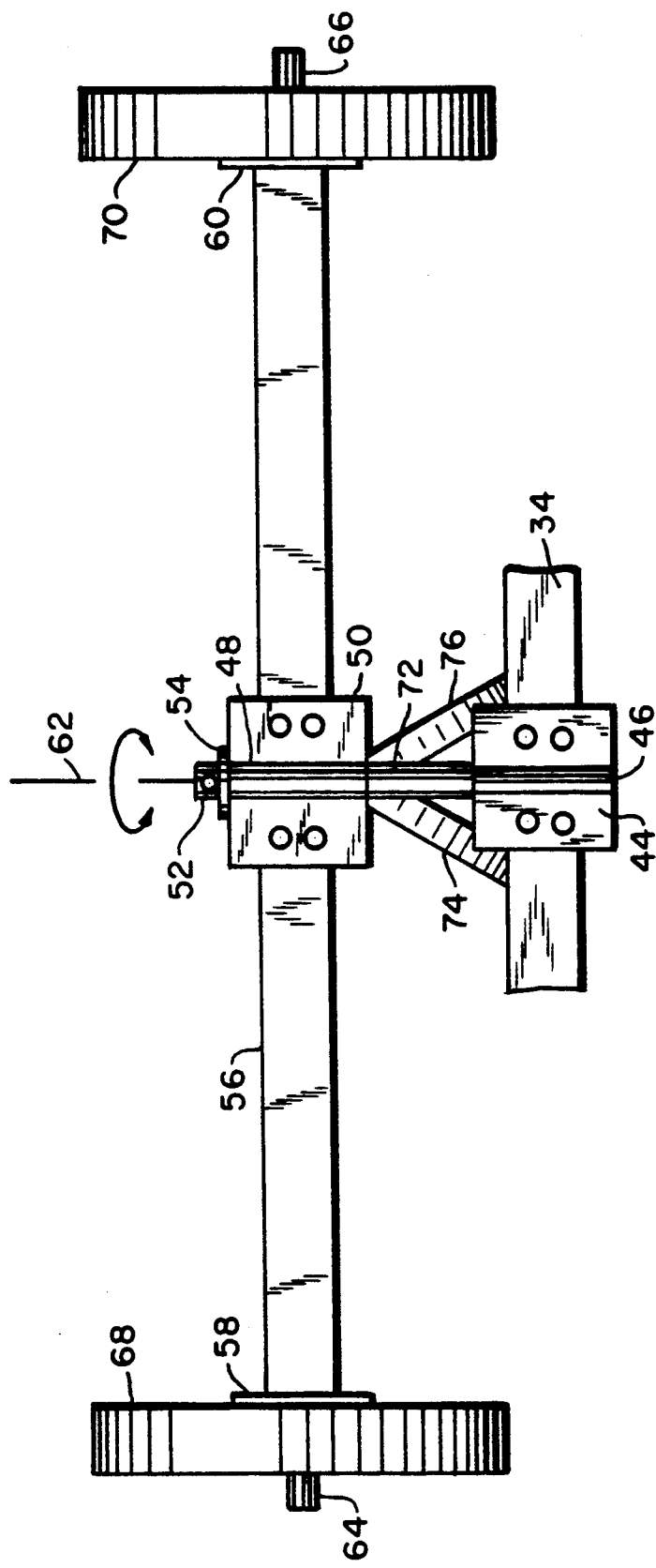
FIG. 4 is a schematic underside plan view of the front axle.
Figure 5:
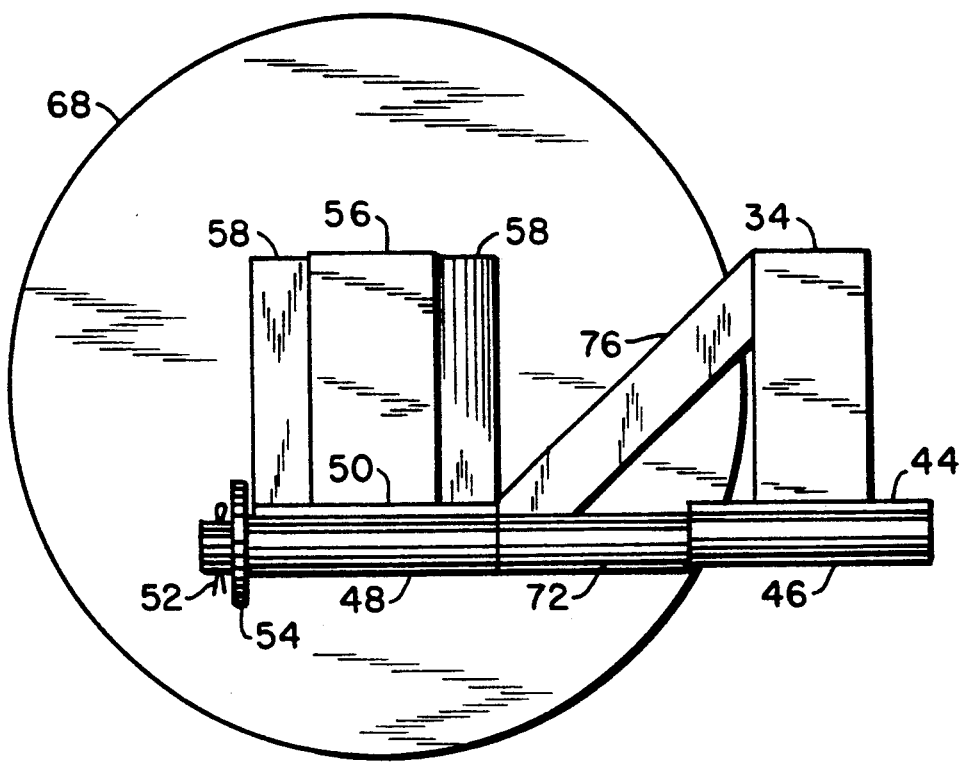
FIG. 5 is a schematic side elevation of the front axle.

On the underside of the crossmember 34, equidistant from both ends, is connected a pivot mount plate 44, as is also illustrated in FIGS. 4 and 5. Projecting forwardly from the centre of the pivot mount plate 44 is an axle pivot shaft 46. This is received within a pivot sleeve 48 mounted in the centre of a pivot sleeve mount plate 50, and held in place by a pin 52 and a washer 54. The pivot sleeve mount plate 50 is centrally mounted on the underside of a framework member 56, which has axle backing plates 58 and 60 mounted on each end. This arrangement allows the framework member 56 to be rotated about an axis 62. Connected to the centre of axle backing plates 58 and 60 are stub axles 64 and 66 which support front wheels 68 and 70. Supporting the pivot shaft 46 between the pivot mount plate 44 and the pivot sleeve mount plate 50 is a pivot spacer 72, which comprises a sleeve which is further supported by front axle pivot supports 74 and 76 which connect to the front crossmember 34.

Figure 6:
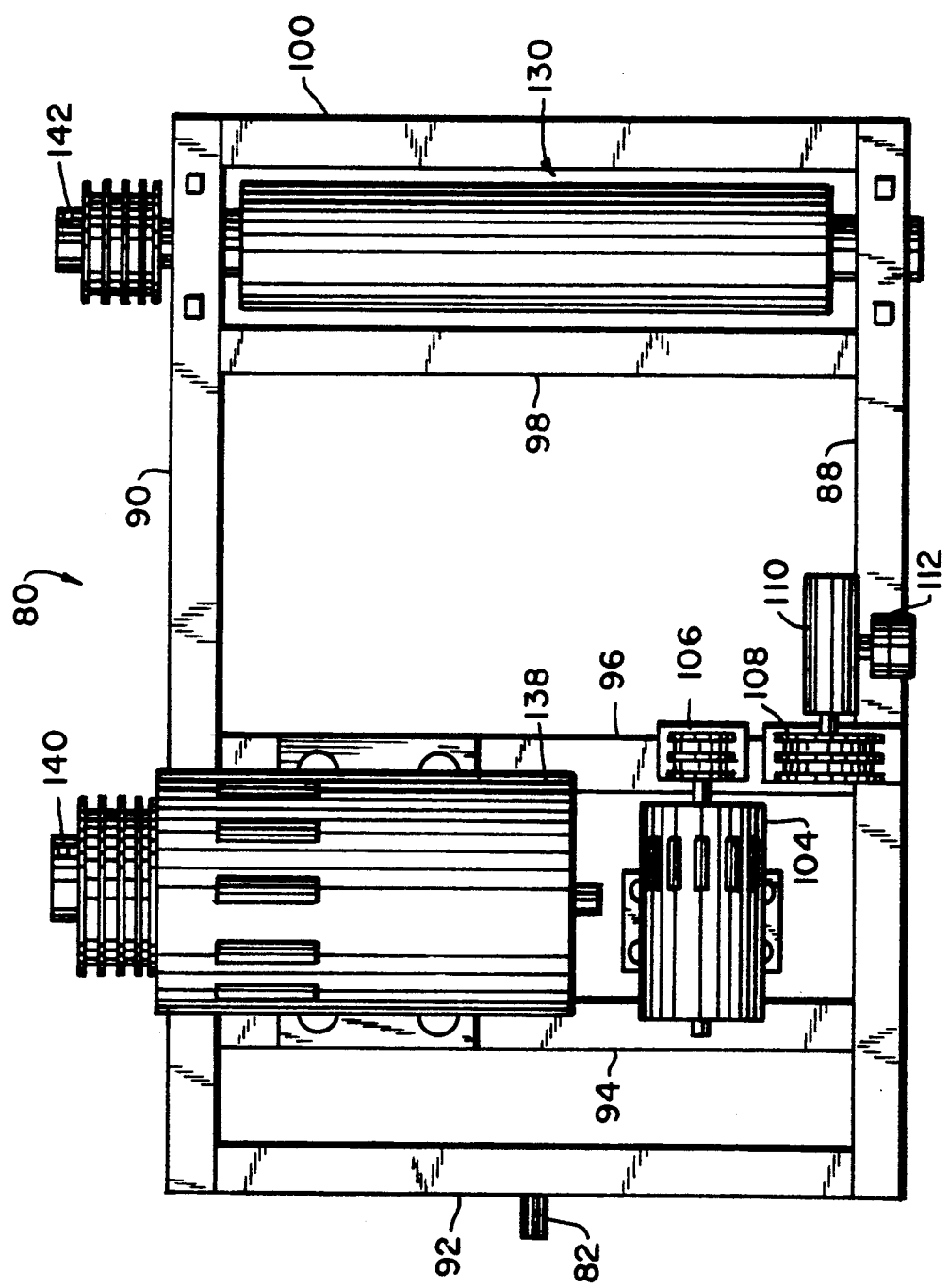
FIG. 6 is a schematic plan view of the swingarm assembly.
Figure 7:
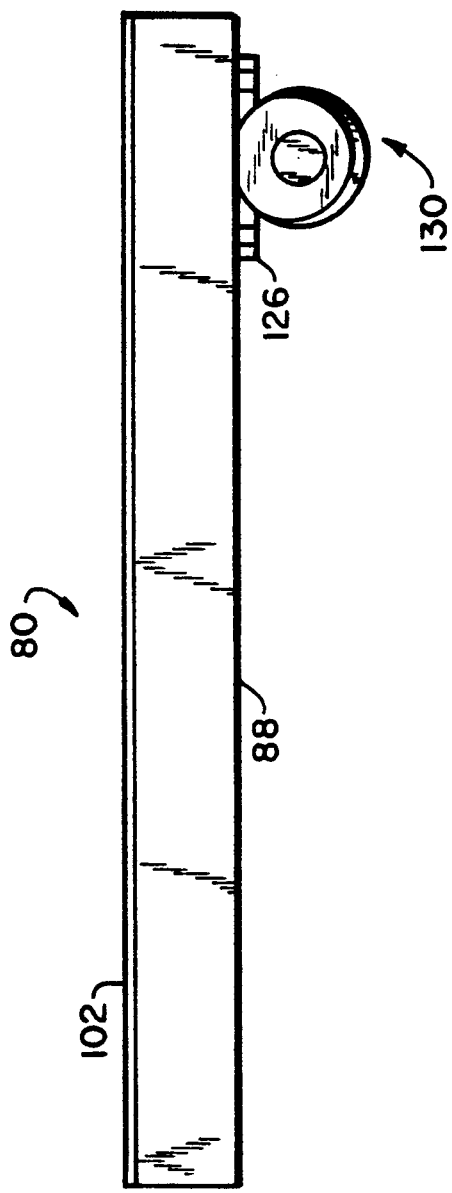
FIG. 7 is a schematic side elevation of part of the swingarm assembly.
Figure 8:
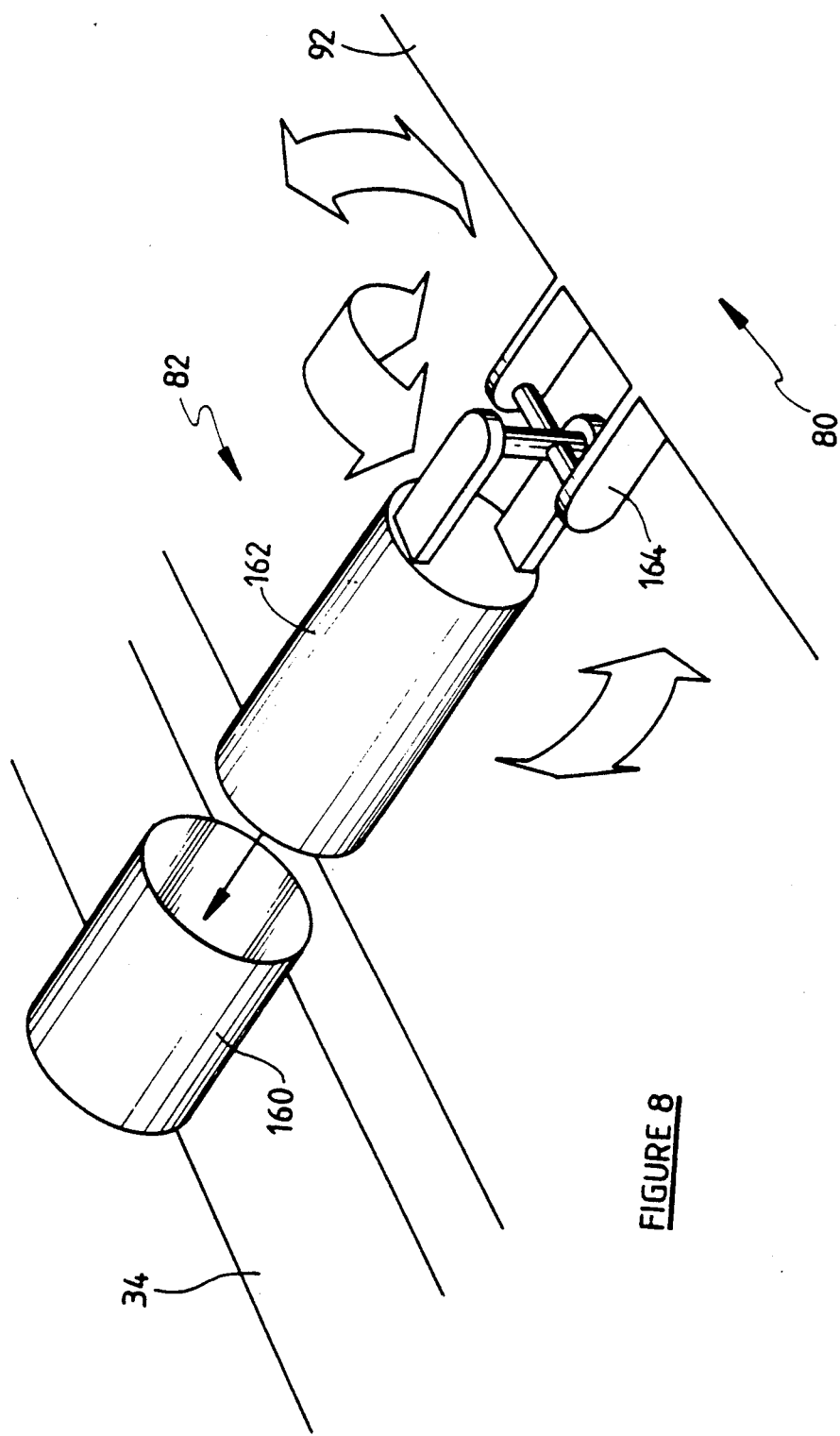
FIG. 8 is an exploded view of part of the device.
Figure 9:
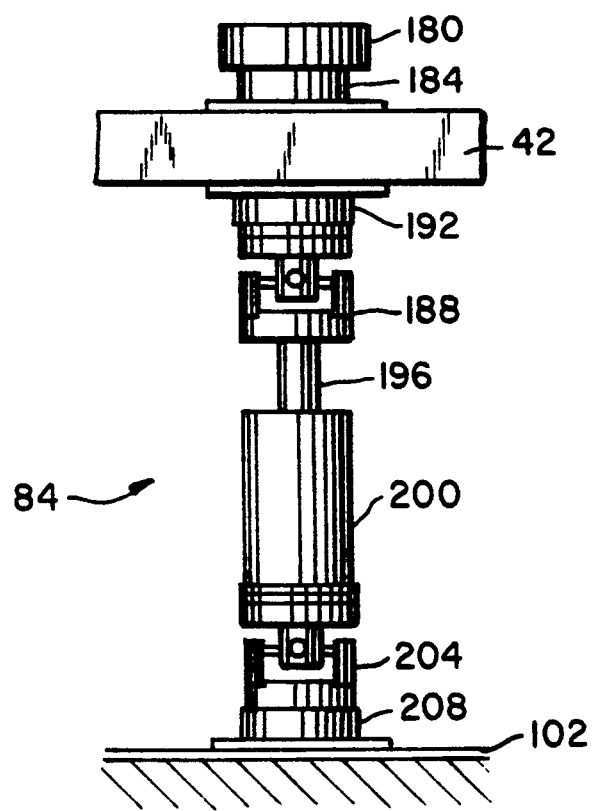
FIG. 9 is a schematic side elevation of the height adjusting subsystem.

The framework 4 carries a swingarm assembly 80 which is illustrated in FIGS. 6 and 7. The swingarm assembly 80 is connected to the framework 4 by means of a coupling 82, which is illustrated in FIG. 8, and left and right height adjusting screw assemblies 84 and 86, which are illustrated in FIG. 9.

The swingarm assembly 80 consists of sidearms 88 and 90 to which are connected crossbars 92, 94, 96, 98 and 100. A swingarm plate 102 is mounted on top of the sidebars 88 and 90 and the crossbars 92, 94, 96, 98 and 100 and covers the entire area of the swingarm assembly.

Figure 2:
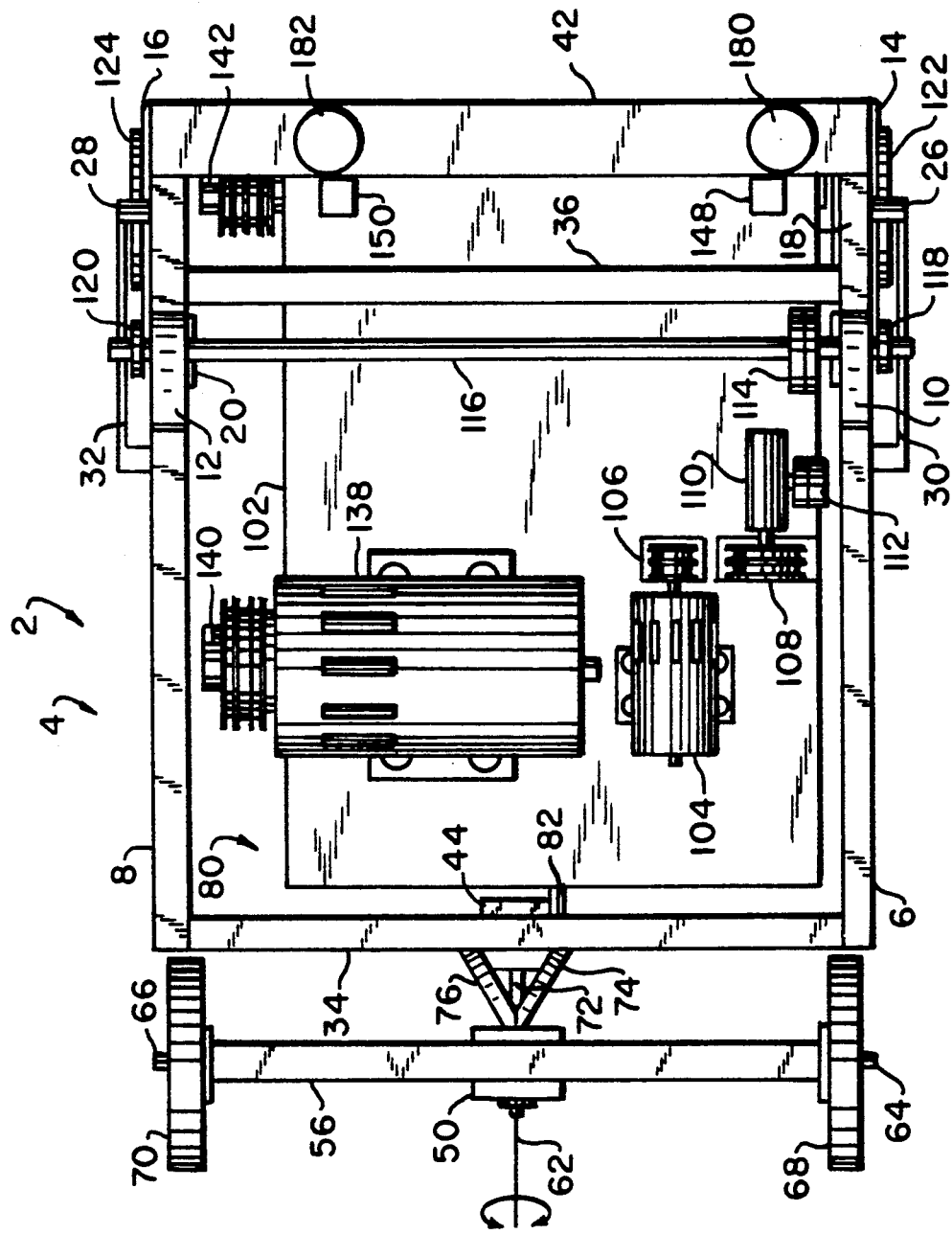
FIG. 2 is a schematic plan view of the device.
Figure 3:
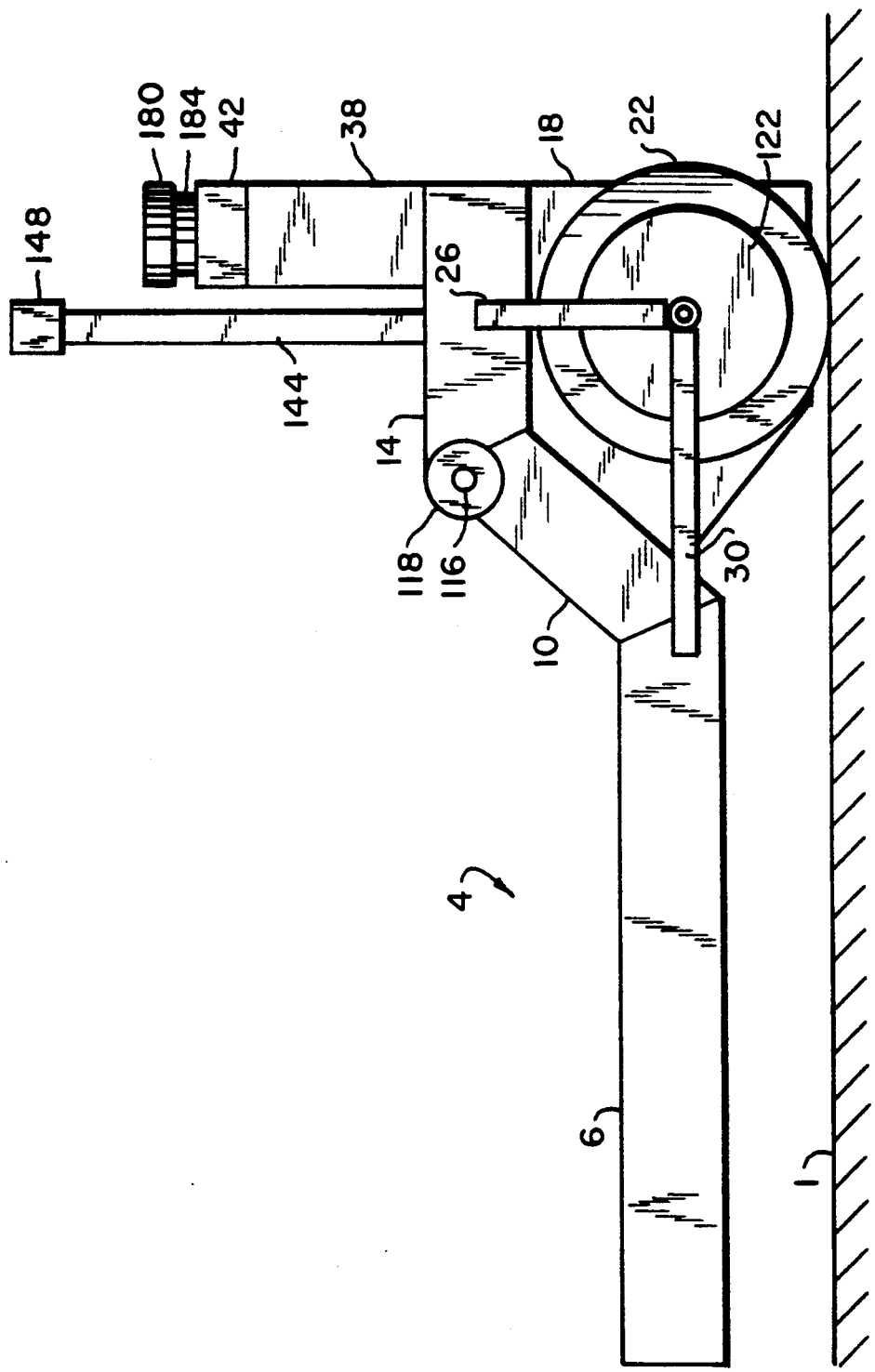
FIG. 3 is a schematic side elevation of the framework.

A wheel drive motor 104 is mounted on the swingarm plate 102. The output shaft of the motor 104 is connected to a drive pulley 106 coupled by a belt (not shown) to a pulley 108. The pulley 108 is connected to the input shaft of the gearbox 110, which is also mounted on the swingarm plate 102, while the output shaft of the gearbox 110 is connected to a duplex sprocket 112. The sprocket 112 is coupled by a chain (not shown) to a duplex sprocket 114 as shown in FIG. 2. The sprocket 114 is mounted on a shaft 116 which is mounted on the sidearms 10 and 12 and extends beyond sidearms 10 and 12. Simplex sprockets 118 and 120 are connected to the shaft 116 on the outside of the sidearms 10 and 12. The sprockets 118 and 120 are coupled by chains (not shown) to sprockets 122 and 124 connected to the rear wheels 22 and 24. In this way the motor 104 causes simultaneous rotation of the rear wheels 22 and 24 for driving the framework 4 forward only, in a nominally straight line and against the direction of rotation of a cutting head 130, across a surface 1 to be levelled.

Bearing housings 126 and 128 project downwardly from the rear sides of the swingarm sidebars 88 and 90.

Figure 10:
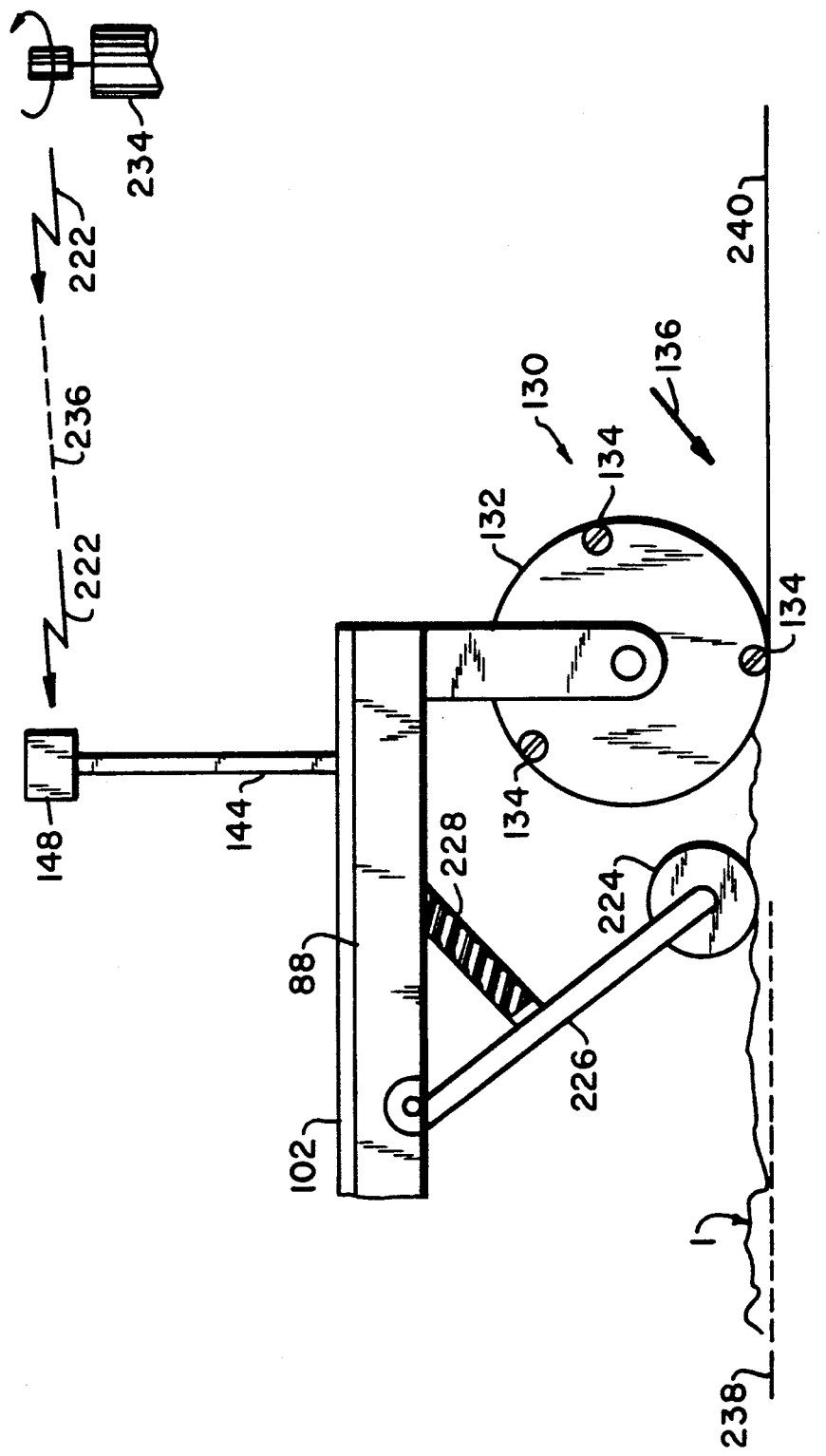
FIG. 10 is a fragmentary side view showing part of the device.

The housings 126 and 128 support bearings (not shown) for the cutting head 130. The cutting head 130 is in the form of a solid metal drum 132 having three longitudinally extending blades 134 which project radially from the drum 132 as illustrated in FIG. 10. The drum is preferably about 130 mm in diameter and about 600 mm long. The blades 134 extend the full length of the drum 132. The cutting head 130 can be the same as that used in a 600 mm thicknesser made by ALLEN WOLFENDEN MACHINERY. A cutting head drive motor 138 is mounted on the plate 102 and is coupled to rotate the cutting head 130 by means of pulleys 140 and 142 and four belts (not shown). The load on the motor 138 is quite heavy and therefore a motor of the order of 7 kw may be required. The cutting head 130 preferably rotates at about 4500 rpm in the direction of arrow 136. A rotating brush (not shown) may also be mounted under the plate 102 for sweeping the floor upstream of the cutting head 130. If such a brush is not mounted the floor upstream of the cutting head 130 should be swept by other means.

Also mounted on the plate 102 are posts 144 and 146 upon which are swivel mounted left and right hand laser detectors 148 and 150. As will be explained hereinafter, the detectors receive laser signals and provide control information to control the orientation of the rear of the assembly 80 relative to the framework 4, thus keeping the relationship between the cutting head 130 and a median plane constant.

Mounted on the rear of the framework 4 is a rear guard (not shown) which extends the width of the framework 4 from the bottom of the rear axle plates 18 and 20 to the top of the rear crossmember 42. This rear guard, along with the rear axle plates 18 and 20 and the swingarm plate 102 form a protective housing around the cutting head 130, preventing material removed by the cutting head 130 from escaping.

FIG. 8 shows in more detail the preferred form of coupling 82 for mounting of the forward end of the assembly 80 to the crossbar 34. The crossbar 34 includes a rearwardly projecting sleeve 160 which receives a shaft 162. The shaft 162 is connected by means of a universal joint 164 to the forward edge of the swingarm crossbar 92 while a nut (not shown) on the forward end of the shaft 162 prevents axial movement of the shaft 162 in sleeve 160. The construction of the coupling 82 enables three-dimensional rotation of the assembly 80 relative to the bar 34 such that independent height adjustment of either end of the cutting head 130 may be achieved.

Figure 11:
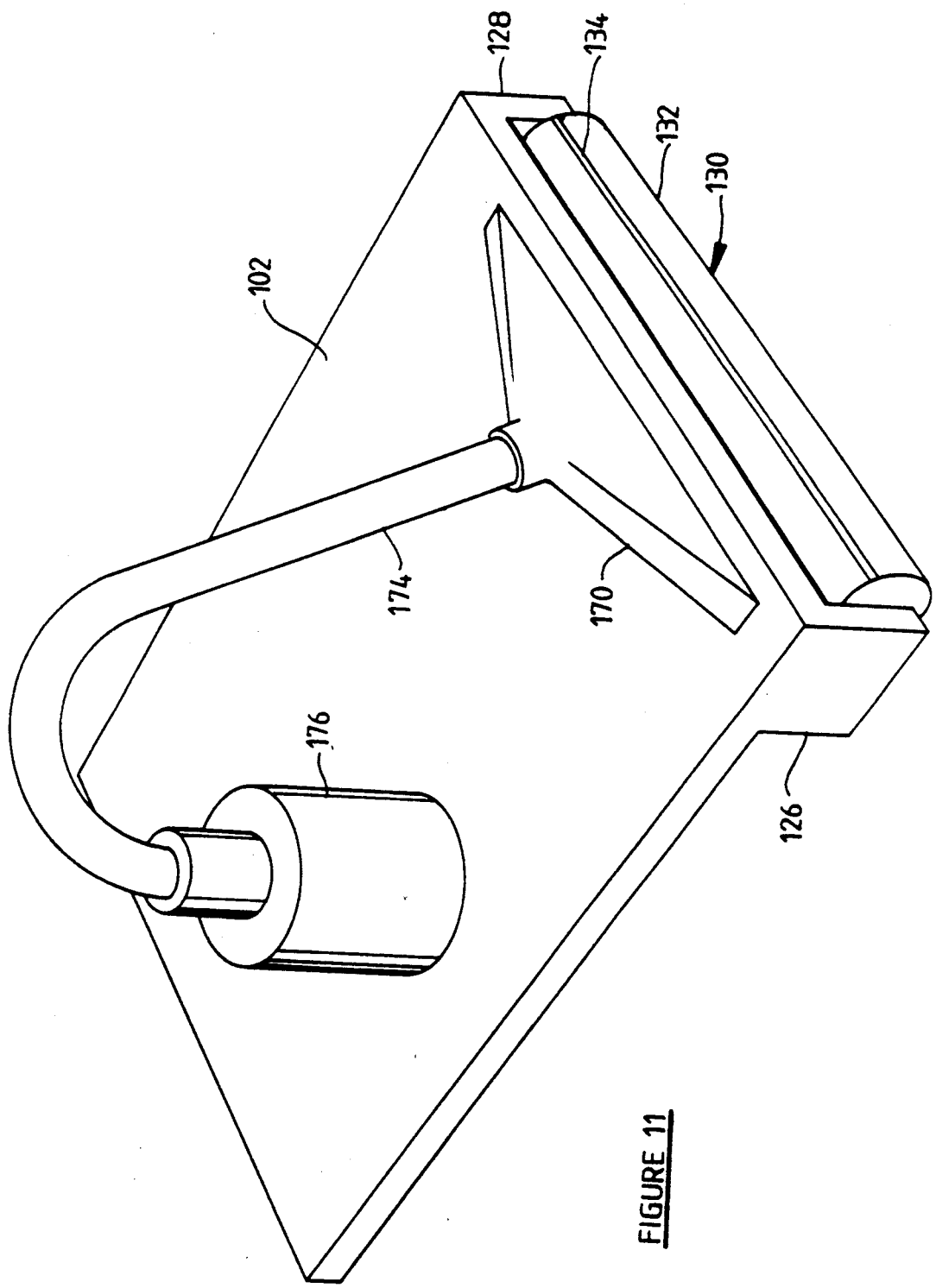
FIG. 11 is a schematic view of the extraction system.

FIG. 11 shows an exhaust extraction system which is mounted on the assembly 80 for sucking up particles or shavings of material which have been removed by the cutting head 130. It includes an extraction manifold 170 mounted over a slot (not shown) formed in the plate 102 above the cutting head 130. The manifold 170 is connected by means of a hose 174 to a suction fan and motor unit 176 also mounted on the plate 102. The unit 176 conveys the waste materials to a bin or hopper (not shown) which is mounted on the device 2.

FIG. 9 shows the height adjusting assembly 84 connecting the swingarm plate 102 to the rear framework crossmember 42. The height adjusting assemblies 84 and 86 include left and right hand adjusting motors 180 and 182 mounted on the top of the rear framework crossmember 42 by means of brackets 184 and 186. Drive shafts (not shown) of the motors 180 and 182 pass through openings in the crossmember 42 and are connected to universal joints 188 and 190. The universal joints 188 and 190 are connected to the bottom of the rear framework crossmember 42 by means of brackets 192 and 194. The bottoms of the universal joints 188 and 190 are connected to male acme threaded shafts 196 and 198. The lower ends of the shafts 196 and 198 are received within female threaded sleeves 200 and 202 and the lower ends of the sleeves 200 and 202 are connected to universal joints 204 and 206. The universal joints 204 and 206 are connected to the rear corners of the swingarm plate 102 by means of brackets 208 and 210.

Rotation of the motors 180 and 182 will cause rotation of the screws 196 and 198 and therefore will cause raising or lowering of the rear corners of the assembly 80 and hence the ends of the cutting head 130. The operation of the motors 180 and 182 is independent and therefore the position of the right and left ends of the cutting head 130 can be independently controlled. The control of motors 180 and 182 can be manual from a control panel 220, illustrated in FIG. 12, or automatic via control signals transmitted via a laser beam 222, as illustrated in FIG. 10.

FIG. 10 shows a pressure roller 224 which may be provided to force down any loose floor boards prior to passing of the cutting head 130. The roller 224 is carried by a pair of arms 226 the upper ends of which are pivotally connected to the side arms 88 and 90 of the swingarm 80. Springs 228 act between the side arms 88 and 90 and the arms 226 and force roller 224 into contact with the surface 1. The springs 228 also function as shock absorbers.

Figure 12:
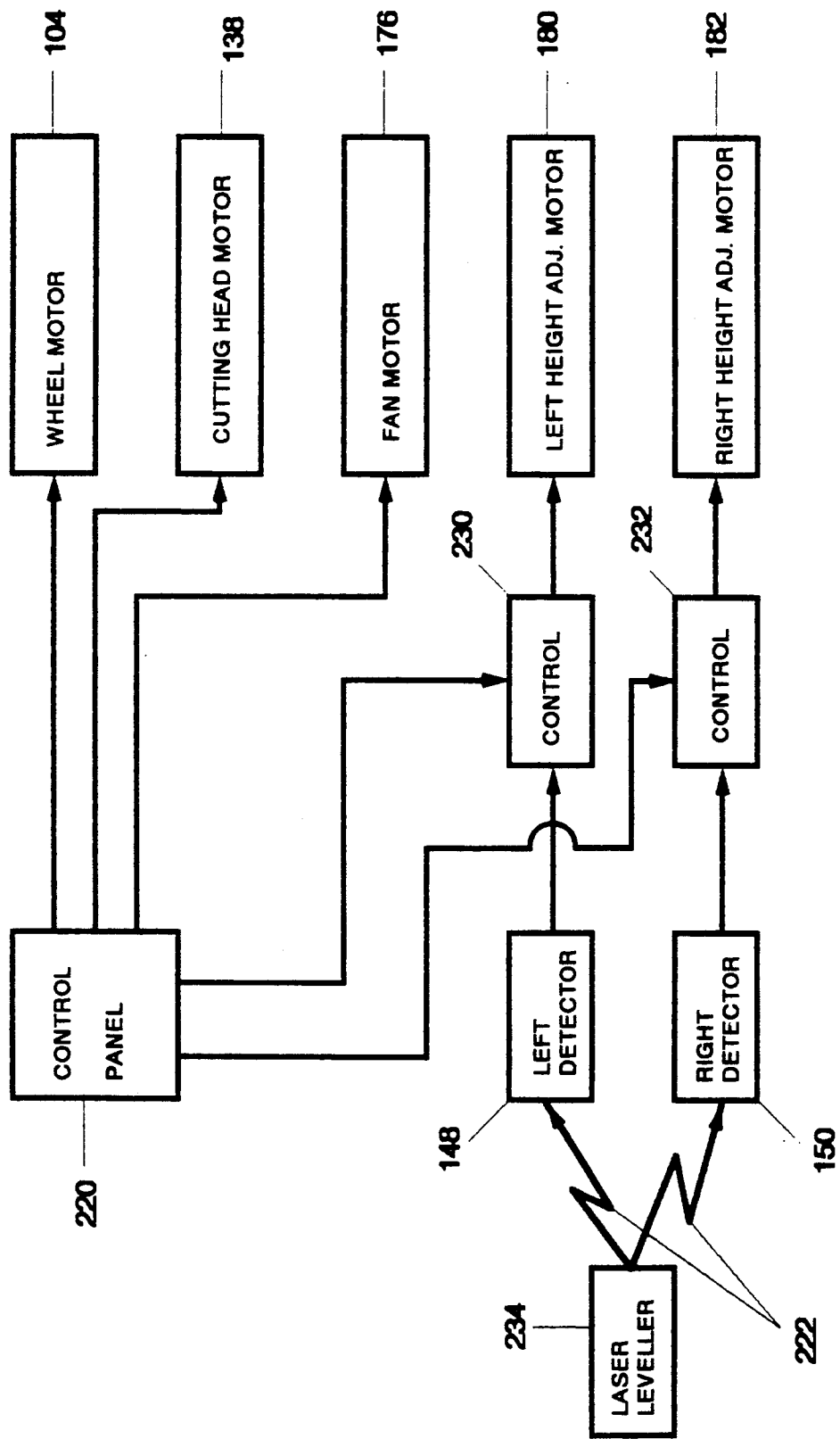
FIG. 12 is a block diagram of the control system for the device.

FIG. 12 illustrates in block-diagram form the control system for the device 2. The control system includes the control panel 220 which has outputs coupled to the wheel motor 104, head motor 138, fan motor 176 and control circuits 230 and 232. The control panel 220 may include starting circuits (not shown) for the motors, if required, and also may include speed control circuits for these motors. The outputs of both the manual control circuits for the motors 180 and 182 on the control panel 220 and the laser detectors 148 and 150 are also coupled to the control circuits 230 and 232, the outputs of which control the motors 180 and 182. The motors 180 and 182 are preferably standard DC motors which rotate through a controlled rotation and sense in accordance with output from the control circuits 230 and 232. When the machine is in automatic mode the control circuits 230 and 232 form part of feedback loops which operate to keep the detectors 148 and 150 centred on laser beam 222.

The laser detectors 148 and 150 are preferably of a type which provide information representative of when a laser beam 222 is directly received and also information relative to which part of the sensors within the detectors 148 and 150 is impinged upon by the laser beam 222. In other words the detectors 148 and 150 can each provide three different signals:

(i) signals indicating that the laser beam 222 is directly received by the centre or "zero" or "on desired median plane" section of the detector's sensors, (ii) signals indicating that the laser beam 222 is directly received by the upper or "below desired median plane" section of the detector's sensors, and (iii) signals indicating that the laser beam 222 is directly received by the lower or "above desired median plane" section of the detector's sensors.

These signals are passed to the control circuits 230 and 232 which produce output signals which turn the motors 180 and 182 in the appropriate direction for moving the rear corners of the assembly 80 such that the laser detectors 148 and 150 receive the laser beam 222 closer to the centre of the laser detectors 148 and 150. The sense of rotation of motors 180 and 182 is controlled by the control circuits 230 and 232 producing output in either a positive or negative polarity at one side of the windings of motors 180 and 182.

In the preferred arrangement as shown in FIG. 10, a laser transmitting device 234 is provided and is arranged to produce a beam 222 which rotates through 360 degrees. The beam 222 itself is relatively narrow, say of the order of 3 mm in diameter. When the laser transmitter 234 is to be used, it is located at a fixed point and its position is adjusted so that its plane of rotation, called a reference plane 236, is located at a predetermined distance above, and parallel to, a median plane 238 of the surface 1 to be levelled. Generally the median plane 238 is horizontal and is located just above or below the surface 1 to be treated by the cutting head 130. The distance between the reference plane 236 and the chosen median plane 238 is the same as the distance between the "zero" point of the detectors 148 and 150 and the bottom of the cutting circle of cutting head 130. In some circumstances the surface 1 to be treated may have a predominant slope and it may be inappropriate or impossible to remove the slope to make the surface horizontal without removing more than an allowable amount of parent material from surface 1. In this case, the median plane 238 follows the predominant slope of surface 1 and the reference plane 236 of the laser is made parallel with the median plane 238 of the surface 1. In other circumstances the surface 1 may have sagged or buckled to the point where the vertical distance between the highest and lowest points of surface 1 is greater than the allowable amount of parent material which may be removed from surface 1. In this case the depressions in surface 1 could be filled with a filling material, such as wood particle board, until the vertical distance between the highest and lowest points of surface 1 is less than the allowable amount of parent material which may be removed from surface 1. The device 2 of the invention then removes all material above a plane 238 to form a new, flattened surface 240 on the floor.

The laser transmitter 234 preferably rotates at about 6 cycles per second. The circuits 230 and 232 include holding circuits so as to hold signal levels between successive rotations of the laser beam 222 so as to continue desired movement of the motors 180 and 182 until the next rotation of the laser beam 222. In this way the motors 180 and 182 will move the detectors 148 and 150 in a direction which will reduce the distance between the reference plane 236 and the "zero" points of the detectors 148 and 150, unless the reference plane 236 is close enough to the "zero" point of the detectors 148 and 150 for the detectors 148 and 150 to produce a null signal. At the next cycle laser beam 222 will again impinge upon laser detectors 148 and 150 which produce a new signal for control circuits 230 and 232. Laser transmitter 234 can be supplied by SPECTRA-PHYSICS PTY. LTD. of Melbourne, Australia.

Figure 13:
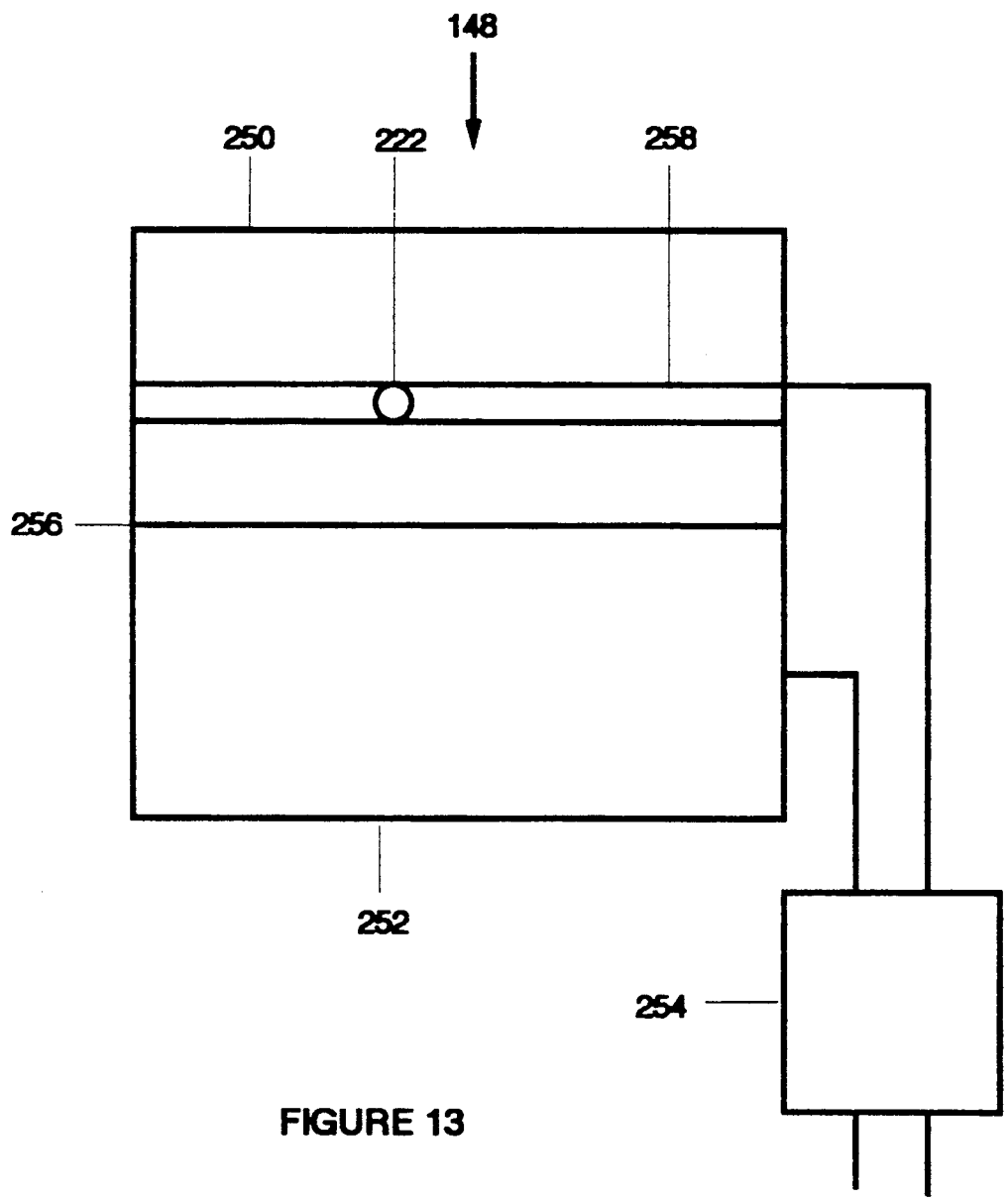
FIG. 13 is a schematic view of the laser receivers.

The laser detector 148 illustrated in FIG. 13. It consists of solar cells 250 and 252 whose output is dependent upon the amount of light reaching the surface of the cell. The outputs of the solar cells 250 and 252 are sent to a measuring circuit 254. The solar cells 250 and 252 are separated by gap 256 which is in the order of 0.1 mm. The output of the measuring circuit 254 is dependent on the difference in power output between the solar cells 250 and 252. When the sweep of the laser beam 222, shown as sweep 258 and always set to be parallel to gap 256, is striking only the cell 250 then the cell 250 will produce more power than the cell 252. The measuring circuit 254 will then produce an output indicating that the detector 148 is below the desired median plane. Similarly if the sweep of the laser beam 222 is striking only the cell 252 then the measuring circuit 254 will produce an output indicating that the detector 148 is above the desired median plane. When the sweep of the laser beam 222 is striking both cells 250 and 252, then measuring circuit 254 will produce a lower strength output indicating that the detector 148 is below the desired median plane when the cell 250 receives the majority of the beam 222, or above the desired median plane when the cell 250 receives the majority of the beam 222. When the cell 250 receives about the same proportion of the beam 222 as the cell 252, then the measuring circuit 254 produces a null signal indicating that the detector 148 is on the desired median plane. The detector 150 functions in a similar manner, and its operation need not be described.

Once the rotating laser transmitter 234 has been set up to sweep the laser beam 222 in the reference plane 236, the device 2 of the invention is located so that the detectors 148 and 150 can receive the laser beam 222 the detectors are preferably swivel mounted so that they can be aligned in the direction of the transmitter 234. To start the machine, the motors 180 and 182 are set (via manual control circuits on the control panel 220 and the control circuits 230 and 232) to raise cutting head 130 above the floor such that the cutting circle of the cutting head 130 is above the surface 1 and the lower half of the sensors of the detectors 148 and 150 are being impinged upon. The motor 138 is then started and left to run up to speed, while the motor 176 starts and drives the suction fan. Then the motor 104 is started and the machine moves forward. The motors 180 and 182 are then set to automatic to commence lowering the cutting head 130 via inputs received by the control circuits 230 and 232 from the laser detectors 148 and 150. The motors 104, 138 and 176 then continue at full speed while the motors 180 and 182 are controlled by the controllers 230 and 232. Full speed is about 0.7 meters per minute. When device 2 encounters irregularities in the surface 1, the framework 4 follows these irregularities and so causes the "zero" section of the sensors in the detectors 148 and 150 to move out of the reference plane 236 such that the sensors in the detectors 148 and 150 are impinged upon by the laser beam 222 in either the upper or lower portion of the sensors. This will cause detectors 148 and 150 to send signals to control the circuits 230 and 232 which will activate the motors 180 and 182 to move the rear of the swingarm assembly 80 relative to the framework 4 in order to keep the bottom of the cutting circle of the cutting head 130 on plane 238. In this way many perturbations in the surface can be removed thus improving its quality.

The device of the invention can be used for levelling timber floors. With appropriate modifications, the device can be used for levelling other types of floors. For instance a scabbler head can be used to replace the cutting head 130 for levelling concrete or masonry floors. With appropriate modifications, the device can be used for levelling walls and ceilings.

Many further modifications will be apparent to those skilled in the art without departing from the spirit and scope of the invention.

We claim:

1. A floor levelling device comprising a framework (4) which is movable over a floor (1) to be levelled, the framework including a forward axle assembly (56,64,66) for at least one front wheel (68,70) and a rear portion (6,8,10,12,14,1634,42) pivotally coupled to the forward assembly for rotation about an axis (62), the rear assembly including rear wheels (22,24), a floor cutting head (130), mounting means (84,86) for mounting the cutting head in the framework such that the orientation of the cutting head relative to the framework can be adjusted, control means (230,232) for controlling the cutting head relative to the framework the control means including at least one sensor (148,150) which is responsive to positional information transmitted to it by a transmitter (234) located at a predetermined location relative to the floor to be levelled.

2. A device as claimed in claim 1 wherein the cutting head includes a rotatable drum (132) having elongate blades (134) mounted therein.

3. A device as claimed in claim 1 including a swingarm assembly (80) which is coupled by a coupling (82) and by said mounting means (84,86) to said rear portion, said cutting head being carried by said swing arm assembly (80).

4. A device as claimed in claim 3 wherein said coupling comprises a universal joint (82).

5. A device as claimed in claims 3 or 4 wherein said mounting means include threaded shafts (196,198) which are received within threaded sleeves (200,202) and wherein the control means includes motors (180,182) to independently rotate said shafts (196,198) to thereby alter the orientation of the cutting head (130) relative to the framework (4).

6. A device as claimed in claim 5 wherein upper ends of the shafts (196,198) are coupled to the motors (180,182) by universal couplings (188,190) and the lower ends of the sleeves (200,202) are coupled to the rear portion of the framework (4) by universal couplings (204,206).

7. A device as claimed in claim 3 wherein the swingarm assembly (80) includes a mounting plate (102), and wherein the cutting head (130) is suspended from the underside of the plate (102) and wherein a cutting head drive motor (138) is mounted on the plate.

8. A device as claimed in claim 3 including a drive motor (104) mounted on the plate (102) for driving said rear wheels (22,24).

9. A device as claimed in claim 3 including a roller (224 pivotally connected beneath the swingarm assembly (80) and biasing means (228) for resiliently biasing the roller into said surface (1).

10. A device as claimed in claim 3 including a suction device for sucking up shavings or particles form the cutting head.

11. A system for levelling a surface comprising a transmitter for transmitting positional information and a surface levelling device comprising a framework which is movable over a surface to be levelled, a surface cutting head, mounting means for mounting the cutting head in the framework such that the orientation of the cutting head relative to the framework can be adjusted, said head including a rotatable drum having elongate blades mounted therein, said framework including a forward axle assembly for at least one front wheel and a rear portion pivotally coupled to the forward assembly for rotation about an axis, the rear assembly including rear wheels, control means for controlling the cutting head relative to the framework, the control means including at least one sensor which is responsive to positional information transmitted to it by the transmitter located at a predetermined location relative to the surface to be levelled.

12. A device as claimed in claim 11 wherein said transmitter comprises a laser (234) which produces a laser beam (222).

13. A device as claimed in claim 12 wherein said beam rotates, in use, in a reference plane (234) and wherein the control means operates to keep the lower part of the cutting head (130) at a constant distance from said reference plane.

14. A device as claimed in claim 13 including two of said sensors (148,150) for controlling the respective mounting means (84,86).

15. A device as claimed in claim 14 wherein each sensor (148,150) has first and second portions (250,252) outputs from which are coupled to a measuring device (254) which determines whether the laser beam impinges more on one or the other of said first and second portions, whereby output from said measuring device can be used to control the sense of operation of said mounting means (84,86).

16. A method of levelling a wooden floor comprising the steps of ascertaining a median plane of the floor to be levelled, sweeping a laser beam in a reference plane which is parallel to the median plane and spaced therefrom by a predetermined distance, moving cutting apparatus across said floor, said apparatus including a cutting head which has a rotatable drum having elongate blades mounted thereon, detecting the laser beam as the cutting device moves across the floor, rotating said drum so that the blades thereof plane the floor, and altering the position of a cutting head in the cutting device so that the cutting head maintains a predetermined relationship to the reference plane independently of movement of the cutting device.

* * * * *